United States Patent [19]

Switlik

[11] Patent Number: 4,960,483
[45] Date of Patent: Oct. 2, 1990

[54] HEAT PRESSING APPARATUS FOR MAKING AN INFLATABLE LIFE VEST AND METHOD FOR USE THEREOF

[75] Inventor: Stanley Switlik, Pennington, N.J.

[73] Assignee: Switlik Parachute Company, Inc., Trenton, N.J.

[21] Appl. No.: 373,011

[22] Filed: Jun. 26, 1989

[51] Int. Cl.⁵ .................. B30B 5/02; B30B 15/34; B32B 31/20
[52] U.S. Cl. .................. 156/290; 441/118; 441/123; 156/308.4; 156/581; 156/583.1; 156/583.2
[58] Field of Search .............. 156/290, 308.4, 581, 156/583.1, 583.2, 274.4, 380.6; 441/118, 116, 123

[56] References Cited

U.S. PATENT DOCUMENTS

| | | | |
|---|---|---|---|
| 2,633,443 | 3/1953 | Langer | 156/273.9 |
| 2,705,523 | 4/1955 | Hasselquist | 156/285 |
| 2,957,513 | 10/1960 | Schneider et al. | 156/251 |
| 3,002,203 | 10/1961 | Moran | 441/118 |
| 3,037,220 | 6/1962 | Jantzen | 441/118 |
| 3,068,500 | 12/1962 | Silverman et al. | 441/118 |
| 3,441,964 | 5/1969 | Koch et al. | 156/210 |
| 3,462,330 | 8/1969 | Greig et al. | 156/197 |
| 3,988,795 | 11/1976 | Robertson | 441/118 |
| 4,035,857 | 7/1977 | Briley et al. | 441/118 |
| 4,083,742 | 4/1978 | Sugimoto | 156/227 |
| 4,193,153 | 3/1980 | Tyrer et al. | 441/118 |
| 4,218,274 | 8/1980 | Mollura | 156/274.4 |
| 4,302,270 | 11/1981 | Nicolet | 156/290 |
| 4,420,356 | 12/1983 | Carpenter | 156/274.4 |
| 4,561,853 | 12/1985 | Faulconer | 441/106 |
| 4,574,026 | 3/1986 | Winther | 156/290 |
| 4,654,016 | 3/1987 | Pendleton | 441/116 |

*Primary Examiner*—Michael Wityshyn
*Attorney, Agent, or Firm*—Sperry, Zoda & Kane

[57] ABSTRACT

An apparatus is disclosed and method for using same wherein a life vest is formed by a single heat sealing operation which effectively forms a front and rear sealed chamber for flotation and effectively interconnects a neck member therebetween for providing a neck gusset also heat sealed in place simultaneously therewith. The apparatus includes a heat sealing body jig for simultaneously sealing of four layers of pneumatically impervious material with respect to one another to form two flotation chambers. Also a neck sealing jig is included as a two member configuration pivotally secured with respect to one another to allow a neck member to be stretched thereover to facilitate attachment thereof by sealing with respect to both flotation chambers. The neck jig includes attachment means for quickly securing the neck material in place.

30 Claims, 4 Drawing Sheets

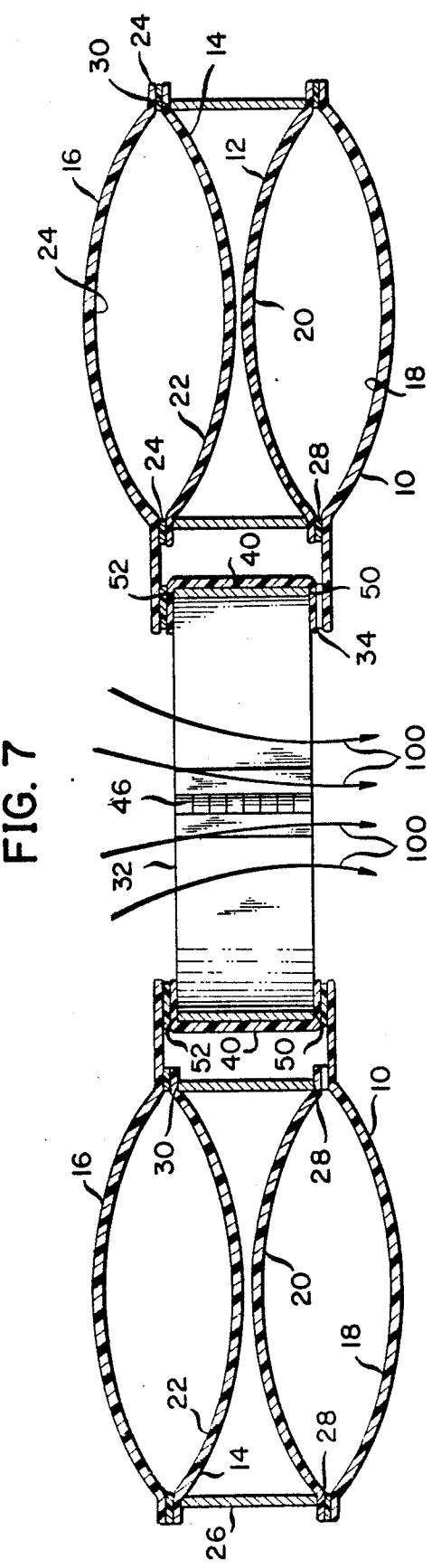
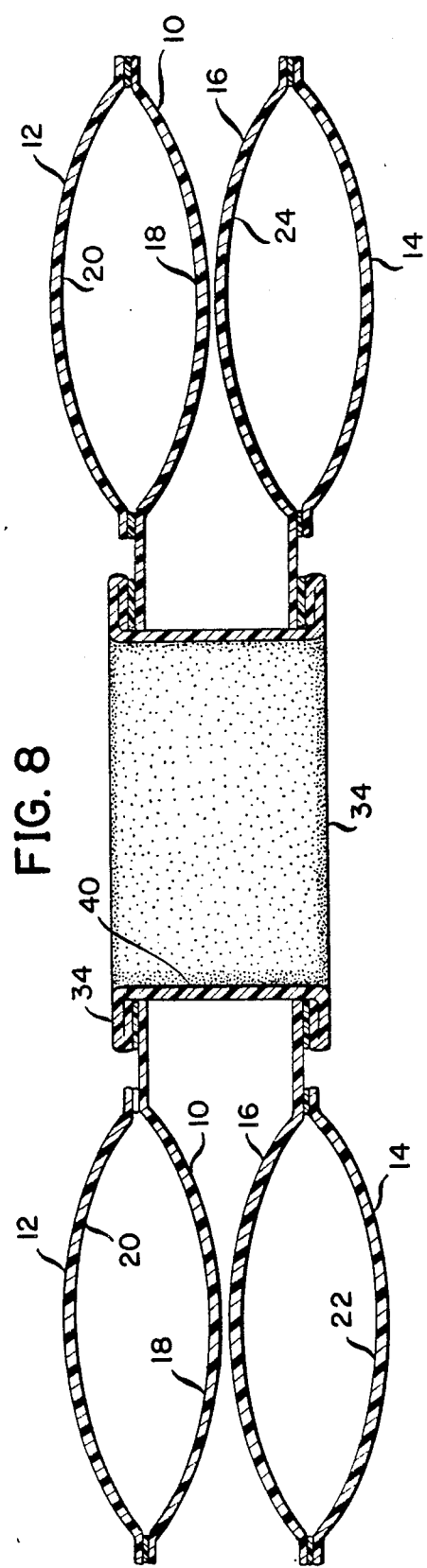

HEAT PRESSING APPARATUS FOR MAKING AN INFLATABLE LIFE VEST AND METHOD FOR USE THEREOF

BACKGROUND OF THE INVENTION

1. Field Of The Invention

The present invention deals with the field of devices usable for forming of emergency life vests which are pneumatically inflatable and are commonly used on airplanes, boats and in other environments where human life threatening situations may occur and flotation vests are desired to be made available. Heretofore most methods for forming such pneumatically inflatable life vests have included extensive sewing operations. With the apparatus and method of the present invention a one-step single heat pressing step allows for complete formation of all securement and sealing operations required for formation of the vest. This single heat sealing step simultaneously forms the flotation chambers and seals the interconnecting neck gusset in place.

2. Description Of The Prior Art

Examples of prior art structures for forming life vests and for prior art patents on such formed life vests see U.S. Pat. Nos. 2,633,443 patented Mar. 31, 1953 to N. Langer on a Method Of Heat-Sealing; 2,705,523 patented Apr. 5, 1955 to V. H. Hasselquist on a Heat-Seaming Apparatus For Thermoplastic Sheet Materials; 2,957,513 patented Oct. 25, 1960 to A. Schneider et al on a Method And Apparatus For Heat Sealing And Severing By Means Of A Stencil And Hot Gas Stream; 3,002,203 patented Oct. 3, 1961 to H. J. Moran on an Inflatable Life Preserver; 3,037,220 patented June 5, 1962 to W. L. Jantzen on a Sail-Float; 3,068,500 patented Dec. 18, 1962 to B. R. Silverman et al on a Life Vest Preserver; 3,441,964 patented May 6, 1969 to H. Koch et al on a Life Jacket; 3,462,330 patented Aug. 19, 1969 to J. W. Greig et al on a Method For Making A Hollow Plastic Core Structure; 3,988,795 patented Nov. 2, 1976 to Robertson on a Life Preserver; 4,035,857 patented July 19, 1977 to Briley et al on a Divers Buoyancy Vest; 4,083,742 patented Apr. 11, 1978 to T. Sugimoto on a Process For Producing Ornamental Standing Toys; 4,193,153 patented Mar. 18, 1980 to Tyrer et al on a Life Jacket; 4,302,270 patented Nov. 24, 1981 to R. D. Nicolet on a Method Of Bonding An Ultrafiltration Membrane Assembly; 4,561,853 patented Dec. 31, 1985 to Faulconer et al on a Buoyancy Compensator, Bladder, And Process Of Manufacture and 4,654,016 patented Mar. 31, 1987 to Pendleton on a Buoyant Vest And Method Of Making The Same.

SUMMARY OF THE INVENTION

The present invention provides a method for making pneumatically inflatable life vests which includes the placement of a first layer and a second layer each of pneumatically impervious material onto a heat sealing processing station. The two layers are placed in abutment with respect to one another and preferably include a thermoplastic coating thereon which is placed between the two abutting layers to facilitate heat sealing therebetween. Normally the first and second layers are oriented horizontally at the heat sealing station and a heat sealing body jig is placed thereon which extends generally peripherally therearound to facilitate sealing thereof and formation of a first sealed flotation chamber. A third and fourth layer of similarly pneumatically impervious material are then placed on top of the heat sealing body jig. The third and fourth layers also each preferably include a thermoplastic coating thereon which is placed in abutment with respect to each other in such a manner as to facilitate heat sealing therebetween and formation of a second sealed chamber. The heat sealing of the body jig includes a body sealing edge extending upwardly and a body sealing edge extending downwardly each of which is adapted to contact the composite structure of the first and second layer and the third and fourth layer, respectively, to effect heat sealing thereof for formation of the respective flotation chambers.

A neck sealing jig is adapted to be positioned adjacent the heat sealing body jig and is adapted to receive a neck member extending thereover. The neck member is designed to be formed into a neck gusset positionable about the neck of a user. The neck jig includes a main neck section and a first neck sealing edge which is oriented extending toward the first layer and is adapted to be covered by the neck member to facilitate heat sealing attachment thereof with respect to the first layer. This sealing is performed simultaneously with the heat sealing of the first and second layers with respect to one another to form a flotation chamber.

In a similar manner a second neck sealing edge is oriented extending toward the fourth layer and is adapted to be covered by the neck member to facilitate heat sealing attachment thereof with respect to the fourth layer. This heat sealing attachment is performed simultaneously with heat sealing of the third and fourth layers with respect to one another to define the second flotation chamber. Preferably the neck member will include a neck coating of thermoplastic material to facilitate securement thereof with respect to the first and fourth layers.

In the preferred configuration the neck sealing jig is of a circular band shape and includes a first neck band section and a second neck band section which are pivotally movably attachable with respect to one another through a hinge means to be pivotable with respect to one another between an open position and a closed position. The neck sealing jig also includes a first neck attachment means on the first neck band section to facilitate selective engagement of the neck member thereon. Furthermore the second neck band section preferably includes a second neck attachment means thereon to facilitate selective engagement of the neck member with respect thereto. In this manner securement of the neck member to the first and second neck attachment means is made possible when the first and second band sections are in the opened position. The band sections are then moved to the closed position which stretches the neck member over the neck sealing jig such that the neck member extends over the first and second neck sealing edges. The first neck sealing edge is positioned adjacent the first and second layers of pneumatically impervious material such that the neck member can be secured thereto. In a similar manner the neck member will be adapted to extend over the second neck sealing edge when the neck sealing jig is moved to the closed position and will be positioned adjacent the third and fourth layers of pneumatically impervious material such as to be sealed thereto to complete formation of the neck gusset extending between the first and second sealed chambers.

It is an object of the present invention to provide a method and apparatus for forming a pneumatically inflatable life vest wherein one-step heat sealing of two flotation chambers is achieved.

It is an object of the present invention to provide a method and apparatus for forming a pneumatically inflatable life vest wherein simultaneous sealing of two flotation chambers and a neck gusset therebetween is achieved.

It is an object of the present invention to provide a method and apparatus for forming a pneumatically inflatable life vest wherein capital outlay required for the heat pressing apparatus is minimized.

It is an object of the present invention to provide a method and apparatus for forming a pneumatically inflatable life vest wherein a one-step heat sealing process is utilized to minimize processing down time.

It is an object of the present invention to provide a method and apparatus for forming a pneumatically inflatable life vest wherein the number of total moving parts is minimized.

It is an object of the present invention to provide a method and apparatus for forming a pneumatically inflatable life vest wherein high efficiency and high speed formation of life vests on assembly lines is made both quick and efficient.

It is an object of the present invention to provide a method and apparatus for forming a pneumatically inflatable life vest wherein a more comfortable neck gusset is utilized sealed in place between a front and rear flotation chamber.

It is an object of the present invention to provide a method and apparatus for forming a pneumatically inflatable life vest wherein the manual labor required for sewing is minimized.

It is an object of the present invention to provide a method and apparatus for forming a pneumatically inflatable life vest wherein loading of the neck gusset into the formation jig is made quick and efficient and accurate by simultaneous one-step heat sealing thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 7 is a cross sectional view of FIG. 1 along lines 7—7;

FIG. 8 is a cross-sectional view of the configuration shown in FIG. 7 after moving the third and fourth layers through the neck area thereof;

DETAILED DESCRIPTION OF THE PREFERRED EMBODIMENT

Figure 1:
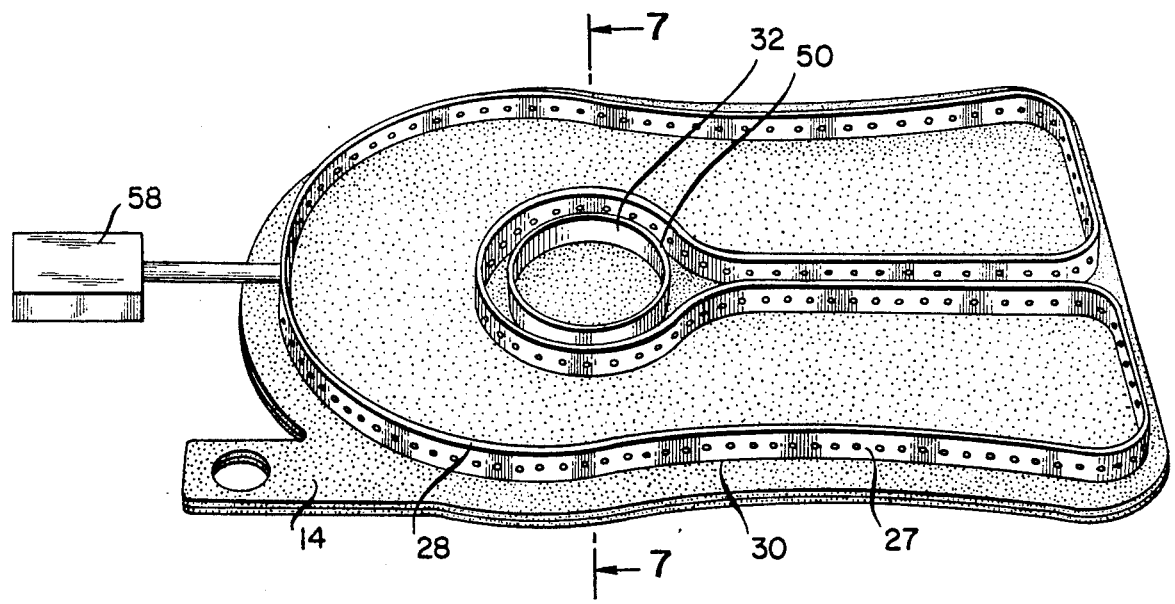
FIG. 1 is a perspective illustration of an embodiment of the heat pressing apparatus of the present invention.

The present invention provides a heat pressing apparatus for making an inflatable life vest as well as a method for specific use thereof which is usable for the formation of as many as two sealed chambers in a pneumatically inflatable life vest. For this purpose a first layer 10 of pneumatically impervious material is placed extending horizontally within a heat sealing station. Preferably the first layer 10 includes a first thermoplastic coating 18 thereon which is preferably oriented in an upwardly extending direction.

A second layer 12 of pneumatically impervious material is then placed horizontally over the first layer 10. Preferably second layer 12 includes a second coating 20 of thermoplastic material which is oriented downwardly such as to be in direct abutment with respect to the first thermoplastic coating 18 on the first layer 10. In this manner firm abutment and the application of heat by a heat sealing jig against the composite structure of the first and second layers 10 and 12 will form a heat seal therebetween and specifically between the thermoplastic coatings 18 and 20.

For this purpose a heat sealing body jig 26 is adapted to be positioned upon the uppermost surface of second layer 12 which is the opposite surface from the second coating 20. This configuration is best shown in FIG. 1 with the heat sealing body jig 26 shown in place. The heat sealing body jig 26 presents a main body section 27 as well as a first body sealing edge 26 extending downwardly therefrom into abutment with respect to the upper surface of the second layer 12. By the application of heat and pressure the first body sealing edge 28 will urge the first and second layers 10 and 12 and the first and second coatings 18 and 20 into abutting contact with respect to one another for sealing therebetween responsive to the pressure and heat applied thereto. Preferably the heat sealing body jig 26 will extend peripherally around the first layer 10 and second layer 12 in such a manner as to form a sealed chamber therebetween during heat pressing.

Figure 6:
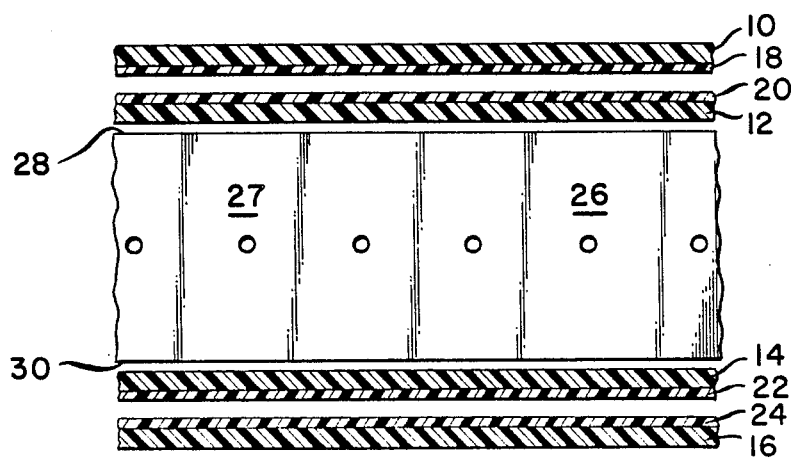
FIG. 6 is a cross sectional view of the complete assembly of the four layers of material and the body heat sealing jig prior to heat pressing thereof.

A third layer 14 of pneumatically impervious material is adapted to be placed upon the heat sealing body jig 26 and in particular upon the second body sealing edge 30 thereof which extends in an upwardly direction as shown best in FIGS. 1 and 6. This third layer 14 preferably includes a third thermoplastic coating 22 which is preferably oriented facing upwardly thereon when the third layer 14 is placed upon the first body sealing edge 28 of heat sealing body jig 26. Thereafter a fourth layer 16 including a fourth thermoplastic coating 24 is placed horizontally over the third layer 14 in abutment therewith. The fourth thermoplastic coating 24 is oriented facing downwardly such as to be in direct abutting contact with respect to the third thermoplastic coating 22. In this manner when heat sealing pressure is applied from above and below the second body sealing edge 30 of heat sealing body jig 26 will push upwardly and urge third and fourth layers 14 and 16 in abutting contact with respect to one another and specifically will cause the third and fourth thermoplastic coatings 22 and 24 to abut one another and the application of heat will cause heat sealing therebetween.

To facilitate the formation of a neck member or gusset 34 between the sealed chambers formed between the first and second layers 10 and 12 and the third and fourth layers 14 and 16 a neck sealing jig 32 is positioned within the heat sealing body jig 26. In this preferred embodiment the neck sealing jig 32 includes a main neck section 48 as well as a first neck sealing edge 50 extending downwardly therefrom and a second neck sealing edge 52 extending upwardly therefrom. Also the neck sealing jig 32 includes a first neck band section 54 and a second neck band section 56 each of which is preferably formed as one half of a band such that when placed adjacent they form one continuous circular band as shown best in FIG. 4. A hinge means 46 is preferably secured to the first neck band section 54 and the second neck band section 56 in such a manner that the band sections are pivotally movable with respect to one another. Preferably the first neck band section 54 includes a first neck attachment means 42 such as a pointed securement means to facilitate securement of the neck member 34 with respect to the first neck band section 54. In a similar manner the second neck band section 56 preferably includes a second neck attachment means 44 which may take the form of a pointed securement means to facilitate securement of the neck member 34 with respect thereto.

The neck member 34 preferably includes a thermoplastic neck coating 40 thereon which is similar to the first, second, third and fourth coatings 18, 20, 22 and 24. The thermoplastic neck coating 40 facilitates heat sealing securement of the neck member 34 with respect to the first layer 10 and the fourth layer 16. A heating means 58 is also preferably included which is attachable with respect to the neck sealing jig 32 as well as attachable with respect to the heat sealing body jig 26 to be capable of heating thereof such that during heat pressing the thermoplastic coatings contacted by the abutment edges of the two jigs 26 and 32 will cause heat sealing of the thermoplastic coatings.

Figure 2:
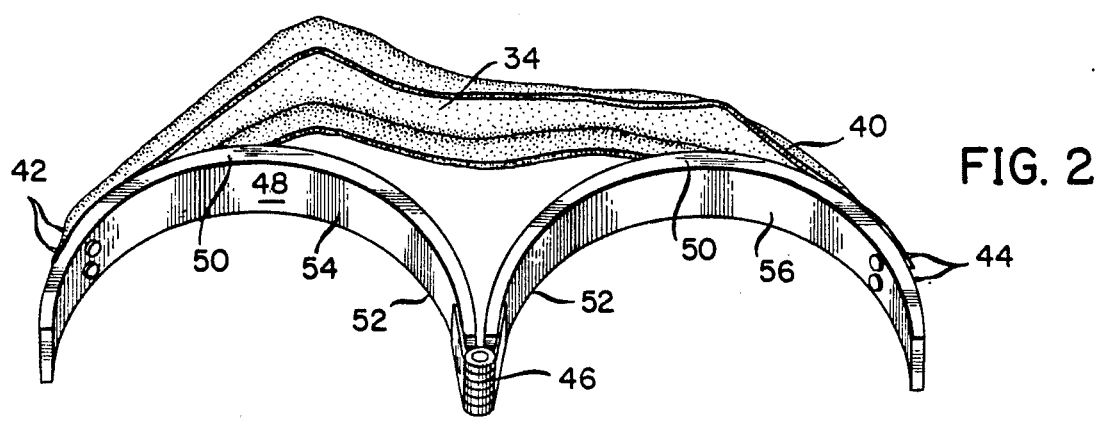
FIG. 2 is a top plan view of an embodiment of the neck sealing jig of the present invention shown in the opened position.
Figure 3:
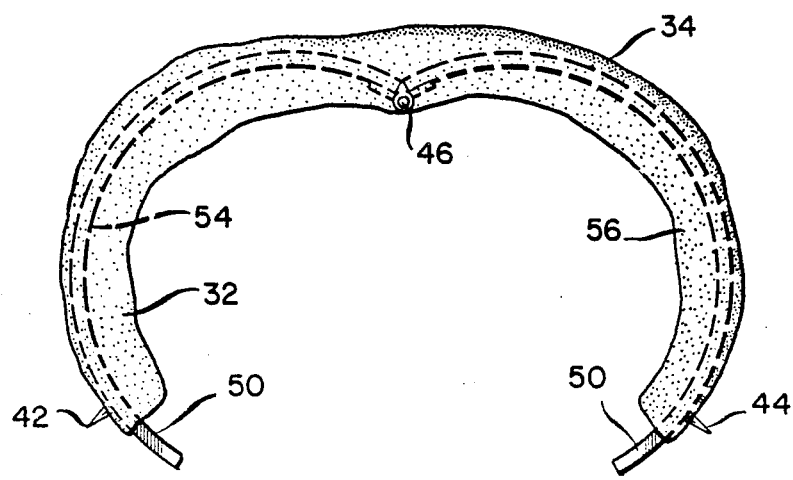
FIG. 3 is a top plan view of an embodiment of the configuration shown in FIG. 2 in the partially opened position.
Figure 4:
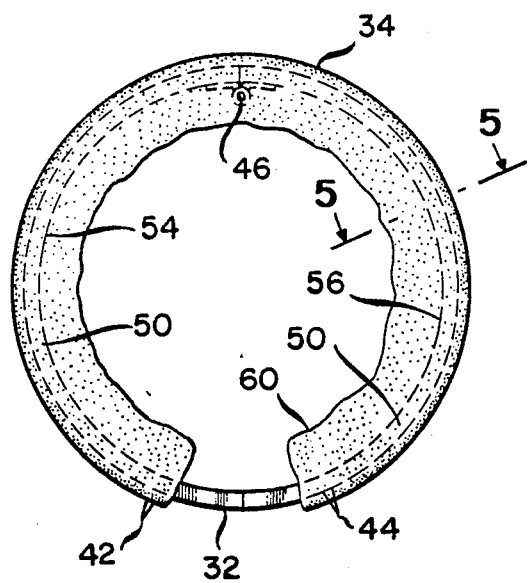
FIG. 4 is a view of the illustration shown in FIG. 2 shown in the completely closed position.
Figure 5:
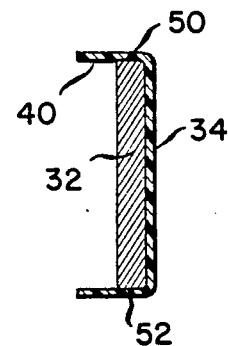
FIG. 5 is a cross sectional view of FIG. 4 along lines 5—5.

In operation the neck sealing jig 32 is initially placed in the completely opened position as shown in FIG. 2. The neck member 34 is then placed with the thermoplastic neck coating 40 facing away from the first and second neck band sections 54 and 56. The neck member 34 is then secured with respect to the first and second neck attachment means 42 and 44. The operator then moves the first and second neck band sections 54 and 56 with respect to one another as limited by the hinge means 46 toward the closed position as shown in FIGS. 3 and 4. As the neck sealing jig 32 is closed the neck member 34 will be stretched over the outer surface thereof and the first neck sealing edge 50 and the second sealing edge 52 will be covered by the outermost peripheral edges of the neck member 34. In this orientation the thermoplastic neck coating 40 will be on the outer facing of the neck member 34 not in abutment with respect to the neck jig 32.

As shown in FIG. 4, the innermost edge 60 of the neck member 34 will extend inwardly within the band formed by the first and second neck band sections 54 and 56 such that the sealing edges 50 and 52 of the neck member 34 will be covered. In this configuration the neck sealing jig 32 is now placed in position as shown in FIG. 1 within the heat sealing body jig 26 with the thermoplastic coating 40 in contact with the first thermoplastic coating 18 of first layer 10 and the fourth thermoplastic coating 24 of fourth layer 16. In this manner heat pressing will cause the first neck sealing edge 50 to urge the thermoplastic coating 40 of neck member 34 to contact first layer 10 to facilitate securement of the neck gusset thereto.

In a similar fashion the second neck sealing edge 52 will cause the thermoplastic coating 40 of neck member 34 to contact the fourth layer 16 to be sealed thereto to facilitate securement of the neck gusset thereto. As such the neck member 34 will be sealed in place between the first and fourth layers 10 and 16.

In the method of the present invention it is preferable to eliminate contact of any type of seams with respect to the neck of a user. For this purpose the method of the present invention includes a reversing operation once the heat sealing is completed. This reversing operation is best understood by comparing the positioning of the elements in FIG. 7 with respect to the positioning of the elements in FIG. 8. FIG. 7 shows the final position of the elements of the present invention with respect to one another immediately after the sealing operation is completed. FIG. 8 shows the final positioning after reversing or the operation of turning the final vest configuration inside out. This movement is best understood by arrows 100 in FIG. 7. After the vest configuration is removed from the sealing jigs 26 and 32, the sealed chamber formed between third layer 14 and fourth layer 16 is moved through the center of neck member 34 as shown by arrows 100. This operation will yield a final configuration shown in FIG. 8 with the positioning of the sealed chambers reversed and with the neck member 34 turned inside out. In this configuration as shown in FIG. 8 member 34 will hide the seams between first layer 10 and second layer 12 and between first layer 10 and neck member 34. The thermoplastic neck coating 40 will then be on the inwardly facing surface of the neck member 34 to facilitate comfort of the user especially important during extended periods of time during which the inflatable life vest of the present invention may be utilized.

Figure 9:
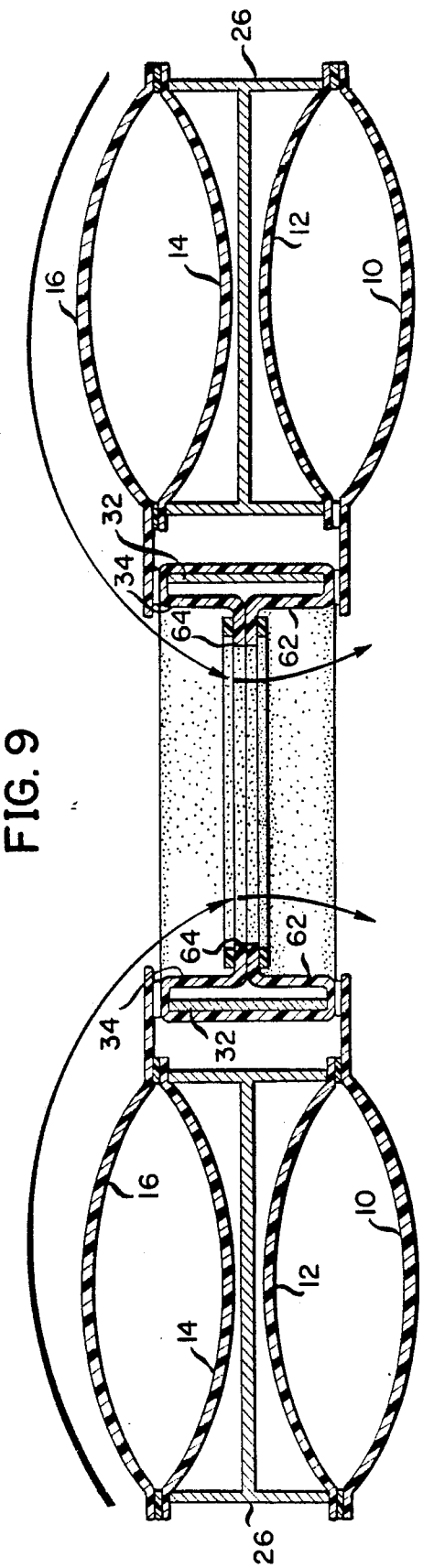
FIG. 9 is a cross-sectional view of an alternative embodiment of the heat pressing apparatus of the present invention.
Figure 10:
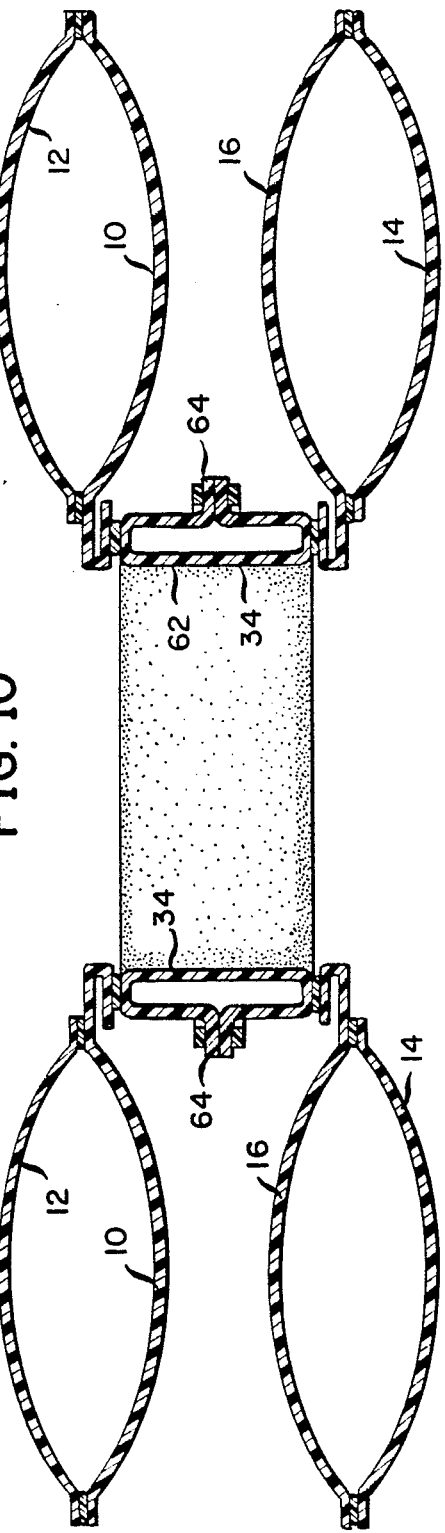
FIG. 10 is a cross-sectional view of the alternative configuration shown in FIG. 9 after moving the third and fourth layers through the neck area thereof.

FIGS. 9 and 10 illustrate alternative embodiments of the present invention which still come within the purview of the present invention. In particular FIG. 9 is analogous to FIG. 7 with however the usage of a tubular neck member 62 which is adapted to extend about and encase the neck member at the time of heat sealing. As shown in FIG. 9 a seam 64 will be positioned inwardly from the neck sealing jig 32 and the tubular neck member 62 will be slid around the neck sealing jig 32 to end in a position encasing therearound. With this configuration it will not be required to include first and second neck attachment means 42 and 44 since the encasement by the tubular neck member 62 will provide the means of securement to the neck sealing jig 32.

It will be necessary during the formation of such a tubular neck member 62 to include a seal 64 which will be desired to be positioned extending inwardly therefrom when in position about the jig 32. Once the heat sealing is completed the final configuration of the inflatable life vest will be turned inside out by urging of layers 14 and 16 in the direction of the arrows shown in FIG. 9 through the center of the neck opening to thereby reverse the positioning of the elements to achieve the final configuration shown in FIG. 10. In that configuration the seams 64 will be positioned as shown extending away from and on the opposite side from the neck opening area to eliminate the possibility of any contact thereof with the neck of a user. As such the present invention contemplates the usage of the double piece hingedly secured neck sealing jig or the single piece integral fixed neck sealing jig 32 to be used in cooperation with the conventional neck member 34 or the tubular neck member 62, respectively.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A method for making a pneumatically inflatable life vest comprising:
    (a) placing a first layer of pneumatically impervious material onto a heat sealing station;
    (b) placing a second layer of pneumatically impervious material in abutting contact with the first layer thereof;
    (c) positioning a first body sealing edge of a heat sealing body jig in abutment with respect to the second layer of material, the heat sealing body jig further including a second body sealing edge;
    (d) placing a third layer of pneumatically impervious material upon the heat sealing body jig in abutment with respect to the second body sealing edge thereof;
    (e) placing a fourth layer of pneumatically impervious material in abutting contact with respect to the third layer thereof;
    (f) wrapping a neck member around a neck sealing jig with the neck member extending over a first neck sealing edge and a second neck sealing edge defined on the neck sealing jig, the neck member defining an opened center therein;
    (g) positioning the neck sealing jig between the first layer and the fourth layer of pneumatically impervious material with the first neck sealing edge adjacent the first layer and the second neck sealing edge adjacent the fourth layer;
    (h) heat pressing to simultaneously heremetically seal:
        (1) the first layer with respect to the second layer along the first body sealing edge of the heat sealing body jig to form a first sealed chamber;
        (2) the third layer with respect to the fourth layer along the second body sealing edge of the heat sealing body jig to form a second sealed chamber;
        (3) the first layer with respect to the neck member along the first neck sealing edge of the neck sealing jig;
        (4) the neck member with respect to the fourth layer along the second neck sealing edge of the neck sealing jig to form a neck gusset being attached with respect to the first and second sealed chambers;
    (i) removing the first layer, second layer, third layer, fourth layer and neck member from the heat sealing station; and
    (j) moving the first sealed chamber formed by the first layer being sealed with respect to the second layer through the opened center of the neck member to turn the neck member inside out to minimize contact of heat sealed seams with respect to the neck of the user.

2. A method for making a pneumatically inflatable life vest is defined in claim 1 wherein the first layer, second layer, third layer and fourth layer are coated with a thermoplastic material to facilitate heating sealing thereof.

3. A method for making a pneumatically inflatable life vest as defined in claim 1 wherein the neck sealing jig includes a first neck section and a second neck section pivotally attached with respect to one another and movable between an opened position and a closed position, the first section including a first neck attachment means and the second section including a second neck attachment means.

4. A method for making a pneumatically inflatable life vest as defined in claim 3 wherein said wrapping includes:
    (a) positioning the first neck section and second neck section of the neck sealing jig in the opened position with respect to one another;
    (b) attaching the neck member with respect to said first neck attachment means of the first neck section;
    (c) attaching the neck member with respect to said second neck attachment means of the second neck section;
    (d) pivotally moving the first neck section and the second neck section to the closed position with respect to one another to stretch the neck member thereover and over the first neck sealing edge and the second neck sealing edge.

5. A method for making a pneumatically inflatable life vest as defined in claim 3 wherein the first neck attachment means comprises a first pointed securement means.

6. A method for making a pneumatically inflatable life vest as defined in claim 5 wherein the first neck attachment means comprises a second pointed securement means.

7. A method for making a pneumatically inflatable life vest as defined in claim 3 wherein the neck sealing jig includes a hinge means pivotally securing the first neck section with respect to the second neck section.

8. A method for making a pneumatically inflatable life vest as defined in claim 1 wherein said heat pressing includes applying of heat to the sealing body jig and the neck sealing jig to facilitate heat sealing.

9. A method for making a pneumatically inflatable life vest as defined in claim 1 wherein the heat sealing body jig extends peripherally around the first, second, third and fourth layers of pneumatically impervious material to facilitate formation of the first and second sealed chambers.

10. A method for making a pneumatically inflatable life vest as defined in claim 2 wherein the first and second layers are positioned with their thermoplastic coatings in abutting contact with respect to one another to facilitate heat sealing therebetween.

11. A method for making a pneumatically inflatable life vest as defined in claim 2 wherein the third and fourth layers are positioned with their thermoplastic coatings in abutting contact with respect to one another to facilitate heat sealing therebetween.

12. A method for making a pneumatically inflatable life vest as defined in claim 1 wherein said neck member includes a thermoplastic coating thereon to facilitate heat sealing thereof.

13. A method for making a pneumatically inflatable life vest as defined in claim 1 wherein the neck sealing jig defines an inside surface and is a single integral fixed member and wherein the neck member is generally tubular shaped and wherein said wrapping is performed by sliding the neck member onto the neck sealing jig into an encasing position.

14. A method for making a pneumatically inflatable life vest as defined in claim 13 wherein the neck member includes a seam means oriented along the inside surface of the neck sealing jig during heat pressing and adapted to be inverted responsive to movement of the first sealed chamber through the opened center of the neck member.

15. A method for making a pneumatically inflatable life vest comprising:
   (a) placing a first layer of pneumatically impervious material onto a heat sealing station, the first layer including a first coating of thermoplastic material to facilitate heat sealing thereof;
   (b) placing a second layer of pneumatically impervious material in abutting contact with the first layer thereof, the second layer including a second coating of thermoplastic material to facilitate heat sealing thereof, the second coating of thermoplastic material being positioned in abutting contact with the first coating of thermoplastic material to facilitate heat sealing therebetween;
   (c) positioning a first body sealing edge of a heat sealing body jig in abutment with respect to the second layer of material and extending peripherally therearound, the heat sealing body jig further including a second body sealing edge;
   (d) placing a third layer of pneumatically impervious material upon the heat sealing body jig in abutment with respect to the second body sealing edge thereof, the heat sealing body jig extending peripherally around the third layer, the third layer including a third coating of thermoplastic material to facilitate heat sealing thereof;
   (e) placing a fourth layer of pneumatically impervious material upon the third layer thereof, the fourth layer including a fourth coating of thermoplastic material to facilitate heat sealing thereof, the fourth coating of thermoplastic material being positioned in abutting contact with the third coating of thermoplastic material to facilitate heat sealing therebetween;
   (f) wrapping a neck member defining an opened center therein around a neck sealing jig with the neck member extending over a first neck sealing edge and a second neck sealing edge defined on the neck sealing jig, the neck member including a coating of thermoplastic material to facilitate heat sealing thereof, the neck sealing jig including a first neck section and a second neck section hingedly secured with respect to one another to be pivotally movable with respect to one another between an opened position and a closed position, the first section including a first neck attachment means and the second section including a second neck attachment means, said wrapping further including:
      (1) positioning the first neck section and second neck section of the neck sealing jig in the opened position with respect to one another;
      (2) attaching the neck member with respect to said first neck attachment means of the first neck station;
      (3) attaching the neck member with respect to said second neck attachment means of the second neck section;
      (4) pivotally moving the first neck section and the second neck section to the closed position with respect to one another to stretch the neck member thereover and over the first neck sealing edge and the second neck sealing edge;
   (g) positioning the neck sealing jig between the first layer and the fourth layer of pneumatically impervious material with the first neck sealing edge adjacent the first layer and the second neck sealing edge adjacent the fourth layer;
   (h) heat pressing to simultaneously heremetically seal:
      (1) the first layer with respect to the second layer along the first body sealing edge of the heat sealing body jig to form a first sealed chamber;
      (2) the third layer with respect to the fourth layer along the second body sealing edge of the heat sealing body jig to form a second sealed chamber;
      (3) the first layer with respect to the neck member along the first neck sealing edge of the neck sealing jig;
      (4) the neck member with respect to the fourth layer along the second neck sealing edge of the neck sealing jig to form a neck gusset being attached with respect to the first and second sealed chambers;
   (i) removing the first layer, second layer, third layer, fourth layer and neck section from the heat sealing station; and
   (j) moving the first sealed chamber formed by the first layer being sealed with respect to the second layer through the opened center of the neck member to turn the neck member inside out to minimize contact of heat sealed seams with respect to the neck of a user.

16. A heat pressing apparatus for use in making a pneumatically inflatable life vest from a neck member and first, second, third and fourth layers of pneumatically impervious material comprising:
   (a) a heat sealing body jig including:
      (1) a main body section;
      (2) a first body sealing edge adapted to be positioned adjacent first and second layers of material oriented in abutting contact with respect to one another to facilitate heat sealing therebetween;
      (3) a second body sealing adapted to be positioned adjacent third and fourth layers of material oriented in abutting contact with respect to one another to facilitate heat sealing therebetween;
   (b) a neck sealing jig positioned adjacent said heat sealing body jig and adapted to receive the neck member extending thereover, said neck sealing jig including:
      (1) a main neck section;
      (2) a first neck sealing edge oriented extending toward the first and second layers and adapted to be covered by the neck member to facilitate heat sealing attachment thereof with respect to the first and second layers of pneumatically impervious material simultaneously with heat sealing of the first and second layers with respect to one another; and
      (3) a second neck sealing edge oriented extending toward the third and fourth layers and adapted to be covered by the neck member to facilitate heat sealing attachment thereof with respect to the third and fourth layers of pneumatically impervious material simultaneously with heat sealing of the third and fourth layers with respect to one another.

17. A heat pressing apparatus for use in making a pneumatically inflatable life vest from a neck member and first, second, third and fourth layers of pneumatically impervious material as defined in claim 16 wherein said first neck sealing edge of said neck sealing jig is adapted to heat seal the neck member directly to the first layer of pneumatically impervious material.

18. A heat pressing apparatus for use in making a pneumatically inflatable life vest from a neck member and first, second, third and fourth layers of pneumatically impervious material as defined in claim 16 wherein said second neck sealing edge of said neck sealing jig is adapted to heat seal the neck member directly to the fourth layer of pneumatically impervious material.

19. A heat pressing apparatus for use in making a pneumatically inflatable life vest from a neck member and first, second, third and fourth layers of pneumatically impervious material as defined in claim 16 wherein said neck sealing jig includes:
   (a) a first neck section; and
   (b) a second neck section pivotally movably attached with respect to said first neck section.

20. A heat pressing apparatus for use in making a pneumatically inflatable life vest from a neck member and first, second, third and fourth layers of pneumatically impervious material as defined in claim 19 wherein said first neck section includes a first neck attachment means to facilitate selective engagement of the neck member with respect thereto.

21. A heat pressing apparatus for use in making a pneumatically inflatable life vest from a neck member and first, second, third and fourth layers of pneumatically impervious material as defined in claim 20 wherein said second neck section includes a second neck attachment means to facilitate selective engagement of the neck member with respect thereto.

22. A heat pressing apparatus for use in making a pneumatically inflatable life vest from a neck member and first, second, third and fourth layers of pneumatically impervious material as defined in claim 9 further comprising a hinge means secured with respect to said first neck section and said second neck section to provide pivotally movable engagement therebetween.

23. A heat pressing apparatus for use in making a pneumatically inflatable life vest from a neck member and first, second, third and fourth layers of pneumatically impervious material as defined in claim 16 with said neck sealing jig being of a circular band shape and further including:
   (a) a first neck band section;
   (b) a second neck band section pivotally movably attached with respect to said first neck band section;
   (c) a hinge means secured with respect to one end of said first neck band section, said hinge means further being secured with respect to one end of said second neck band section to facilitate pivotal movement thereof with respect to said first neck band section;
   (d) a first neck attachment means located on said first neck band section to facilitate selective engagement of the neck member with respect thereto; and
   (e) a second neck attachment means located on said second neck band section to facilitate selective engagement of the neck member with respect thereto for selective stretching of the neck member over said neck sealing jig responsive to pivotal movement of said first neck band section with respect to said second neck band section.

24. A heat pressing apparatus for use in making a pneumatically inflatable life vest from a neck member and first, second, third and fourth layers of pneumatically impervious material as defined in claim 23 wherein said first neck attachment means comprises first pointed securement means.

25. A heat pressing apparatus for use in making a pneumatically inflatable life vest from a neck member and first, second, third and fourth layers of pneumatically impervious material as defined in claim 24 wherein said second neck attachment means comprises second pointed securement means.

26. A heat pressing apparatus for use in making a pneumatically inflatable life vest from a neck member and first, second, third and fourth layers of pneumatically impervious material as defined in claim 16 wherein said first body sealing edge extends peripherally around the first and second layers of pneumatically impervious material being heat sealed together by said heat sealing body jig.

27. A heat pressing apparatus for use in making a pneumatically inflatable life vest from a neck member and first, second, third and fourth layers of pneumatically impervious material as defined in claim 16 wherein said second body sealing edge extends peripherally around the third and fourth layers of pneumatically impervious material being heat sealed together by said heat sealing body jig.

28. A heat pressing apparatus for use in making a pneumatically inflatable life vest from a neck member and first, second, third and fourth layers of pneumatically impervious material as defined in claim 16 further comprising heating means operatively connected with respect to said heat sealing body jig and said neck sealing jig for heating thereof.

29. A heat pressing apparatus for use in making a pneumatically inflatable life vest from a neck member and first, second, third and fourth layers of pneumatically impervious material as defined in claim 16 wherein said neck sealing jig is an integral fixed arcuate member.

30. A heat pressing apparatus for use in making a pneumatically inflatable life vest from a neck member and first, second, third and fourth layers of pneumatically impervious material comprising:
   (a) a heat sealing body jig including:
      (1) a main body section;
      (2) a first body sealing edge adapted to be positioned adjacent first and second layers of material oriented in abutting contact with respect to one another to facilitate heat sealing therebetween, said first body sealing edge extending peripherally around the first and second layers;
      (3) a second body sealing edge adapted to be positioned adjacent third and fourth layers of material oriented in abutting contact with respect to one another to facilitate heat sealing therebetween, said second body sealing edge extending peripherally around the third and fourth layers;
   (b) a neck sealing jig means of a circular band shape and positioned adjacent said heat sealing body jig and adapted to receive the neck member extending thereover, said neck sealing jig means including:
(1) a first neck band section;
(2) a second neck bank section pivotally movably attached with respect to said first neck band section;
(3) a hinge means secured with respect to one end of said first neck band section, said hinge means further being secured with respect to one end of said second neck band section to facilitate pivotal movement thereof with respect to said first neck band section;
(4) a first pointed attachment means located on said first neck band section to facilitate selective engagement of the neck member with respect thereto;
(5) a second pointed attachment means located on said second neck band section to facilitate selective engagement of the neck member with respect thereto for selective stretching of the neck member over said neck sealing jig means responsive to pivotal movement of said first neck band section with respect to said second neck band section;
(6) a first neck sealing edge oriented extending toward the first and second layers and adapted to be covered by the neck member to facilitate heat sealing thereof directly to the second layer of pneumatically impervious material simultaneously with heat sealing of the first and second layers with respect to one another;
(7) a second neck sealing edge oriented extending toward the third and fourth layers and adapted to be covered by the neck member to facilitate heat sealing thereof directly to the third layer of pneumatically impervious material simultaneously with heat sealing for the third and fourth layers with respect to one another; and (c) a heating means operatively connected with respect to said heat sealing body jig and said neck sealing jig means for heating hereof during heat pressing.

* * * * *

UNITED STATES PATENT AND TRADEMARK OFFICE
CERTIFICATE OF CORRECTION

PATENT NO. : 4,960,483
DATED : October 2, 1990
INVENTOR(S) : Stanley Switlik

It is certified that error appears in the above-identified patent and that said Letters Patent is hereby corrected as shown below:

In column 9, line 68, change "station" to -- section --.

In column 10, line 50, after "sealing" insert-- edge --.

In column 11, line 46, change "9" to -- 19 --.

Signed and Sealed this

First Day of December, 1992

Attest:

DOUGLAS B. COMER

*Attesting Officer*     *Acting Commissioner of Patents and Trademarks*